(12) United States Patent
Hanabusa

(10) Patent No.: US 8,430,516 B2
(45) Date of Patent: Apr. 30, 2013

(54) LIGHTING DEVICE FOR PHOTOGRAPHING

(75) Inventor: Shinichi Hanabusa, Tokyo (JP)

(73) Assignee: Serendipity Co., Ltd., Tokyo (JP)

( * ) Notice: Subject to any disclaimer, the term of this patent is extended or adjusted under 35 U.S.C. 154(b) by 81 days.

(21) Appl. No.: 13/167,392

(22) Filed: Jun. 23, 2011

(65) Prior Publication Data

US 2011/0292635 A1  Dec. 1, 2011

Related U.S. Application Data

(63) Continuation-in-part of application No. PCT/JP2009/069584, filed on Nov. 18, 2009.

(51) Int. Cl.
*F21V 33/00* (2006.01)
(52) U.S. Cl.
USPC ....... 362/16; 362/3; 362/296.01; 362/296.07; 362/347
(58) Field of Classification Search .................. 362/3, 8, 362/16, 296.01, 310, 296.05, 296.07, 341, 362/347
See application file for complete search history.

(56) References Cited

U.S. PATENT DOCUMENTS

| | | | | |
|---|---|---|---|---|
| 4,144,556 A * | 3/1979 | Bond | ................................ | 362/16 |
| 5,778,258 A * | 7/1998 | Zamoyski | ........................... | 396/2 |
| 6,659,620 B2 * | 12/2003 | Goto | ............................... | 362/127 |
| 6,672,737 B2 * | 1/2004 | Lai et al. | ........................ | 362/240 |
| 6,814,468 B2 * | 11/2004 | Lai et al. | ........................ | 362/240 |
| 7,396,148 B1 * | 7/2008 | Tsai | ............................... | 362/352 |
| 7,680,401 B1 * | 3/2010 | Adelstein | ........................... | 396/1 |
| 7,953,277 B2 * | 5/2011 | Williams et al. | ............... | 382/173 |
| 2004/0141320 A1 * | 7/2004 | Bock et al. | ...................... | 362/253 |
| 2005/0243538 A1 * | 11/2005 | Blanford | ......................... | 362/16 |
| 2005/0259409 A1 * | 11/2005 | Pohlert et al. | ..................... | 362/3 |

FOREIGN PATENT DOCUMENTS

| | | |
|---|---|---|
| JP | 11-153821 | 6/1999 |
| JP | 2004-325797 | 11/2004 |
| JP | 2005-114928 | 4/2005 |

OTHER PUBLICATIONS

Microfilm of the specification and drawings annexed to the request of Japanese Utility Model Application No. 106856/1990 (Laid-open No. 64715/1992) (Sumitomo Heavy Industries, Ltd.), Jun. 3, 1992, entire text; all drawings (Family: none).

* cited by examiner

*Primary Examiner* — Laura Tso
(74) *Attorney, Agent, or Firm* — K. David Crockett, Esq.; Niky Economy Syrengelas, Esq.; Crockett & Crockett, PC

(57) ABSTRACT

Disclosed is a simple lighting device for photographing, which makes it possible to take an artistic picture of a human, which is an object to be photographed, enhancing his or her facial expressions, without the need of troublesome light source adjustment. The lighting device comprises a reflecting plate (2) which has a concave shaped surface with respect to the object to be photographed and which has a transmission area (22) which permits light to pass therethrough, and a light emitter (1) which is provided on the convex surface side of the reflecting plate (2) and which emits light toward the transmission area (22). The light emitted from the light emitter (1) and transmitted through the transmission area (22) is irradiated onto the object to be photographed and is reflected by the reflecting plate (2) toward the object to be photographed.

10 Claims, 11 Drawing Sheets

LIGHTING DEVICE FOR PHOTOGRAPHING

This application is a continuation-in-part of International Application No. PCT/JP2009/069584 filed Nov. 18, 2009, which claims priority to JP 2008-334302 filed Dec. 26, 2008.

FIELD OF THE INVENTIONS

The present invention relates to a lighting device for photographing, and particularly relates to a lighting device for photographing that is excellent for photographing still images of people.

BACKGROUND OF THE INVENTIONS

In recent years, photographing by photographers in photographic studios has expanded beyond commemorative photographs to include photographs for resumés, for showbusiness portfolios and for passport applications. For a resumé or a showbusiness portfolio, in order to provide a good first impression of the person who is the object to be photographed, it is required that the person's hair and posture be prepared and then the photograph taken by the photographer to present an attractive appearance of the person who is the photography object. For a passport application, because the photograph is an identity photograph that will be used for a long time, it is required that the person's hair and posture be prepared and then the photograph taken, within the dimensions allowed by the regulations, in a way that the person who is the photography object will not later regret.

These photographs are taken in a photographic studio because, in addition to a studio established photographer having the skill to present an attractive impression of the photography object person and take pictures without getting the timings wrong, lighting devices for photographing are installed that are capable of providing lighting in accordance with the objectives of the photography, for a lively and glamorous appearance of the photography object person or for a relaxed feeling or the like.

In general, in a lighting device for photographing, a light source is constituted by plural lamps and, by these lamps being intelligently arranged, may smoothly illuminate a photography object with soft light that is thoroughly diffused. It is known, for example, that the softness of light depends on distribution characteristics of light beams illuminating the photography object in directions of incidence on the photography object (for example, see Japanese Patent Application Laid-Open (JP-A) No. 2005-114928 paragraph 0035 and FIG. 3).

Specifically, light amounts of the plural lamps are adjusted and illuminated so as not to produce deep shadows in parts of the face of the photography object, particularly under the nose and under the jaw, but also so as not to look flat. For example, shadows are strong with a single main light. Therefore, a front light is used as a supplementary light, a top light is added to emphasize the hair line (reflecting off the hair), and an accent light is included. Thus, highlights are produced from the side of the hair to the shoulder, standing out from the back. In addition, a backlight and plural small accent lights or the like may be used. For a preferable facial photograph, illumination that forms a catch light that vividly portrays the pupils of the eyes is important. However, for example, with a person wearing spectacles, a light source being reflected in the spectacles is not appropriate for the objectives of any purpose, whether a resumé, a showbusiness portfolio or an ID photograph. Therefore, careful lighting is required.

However, with an illumination device based on indirect dispersed light distributions from numerous light sources, adjustment of the illumination light amounts of light sources as described above and of distribution characteristics of the light beams is troublesome, and the efficiency of photographing is lowered. If a photography object is photographed with the balance of light sources having been upset, unnatural shadows are produced on the photography object. Accordingly, a photography box is known that reflects illumination light, which is emitted from a light emitter with a single surface, from a reflector that is formed such that reflected light amounts from a central portion are smaller than reflected light amounts from periphery portions, and illuminates and photographs an object to be photographed (for example, see JP-A No. 2004-325797 claim 1, FIG. 1 and FIG. 4).

However, with the photography device recited in JP-A No. 2004-325797, although the production of deep shadows may be prevented, in order to make the illumination light incident on the photography object uniform, light that is reflected by a completely flat reflection plate is illuminated at the photography object. Thus, emphasis of the hair line and formation of a catch light are insufficient to enhance the expression of the person who is the photography object, which is not satisfactory for artistic photographing.

Accordingly, an object of the present invention is to provide a lighting device for photographing with a very simple structure that makes it possible to take an artistic picture of a human who is an object to be photographed, enhancing his or her facial expressions without the need for troublesome light source adjustment.

SUMMARY

The problem described above is solved by a lighting device for photographing that includes: a first reflecting plate including a concave shaped surface with respect to an object to be photographed and including a transmission area that transmits light; and a light emitter provided at a convex surface side of the first reflecting plate and emitting light toward the transmission area, wherein light emitted from the light emitter and transmitted through the transmission area both illuminates the object to be photographed and is reflected by the first reflecting plate to illuminate the object to be photographed. Thus, the object to be photographed is illuminated with both light emitted from the light emitter and transmitted through the transmission area and light emitted from the light emitter, transmitted through the transmission area and reflected by the first reflecting plate.

According to the present invention, light emitted from the light emitter and transmitted through the transmission area of the concave shaped reflecting plate both illuminates the object to be photographed and is reflected by a reflecting area, which has a concave shaped surface that is continuous with the transmission area of the reflecting plate, to illuminate the object to be photographed. Thus, there are no sharp changes in illumination light amounts toward the object to be photographed, and the transmitted light and reflected light may be illuminated with sufficient differences in light amounts but with the light amounts varying continuously. That is, a state of illumination as if the object were being illuminated by numerous light sources whose light amounts are adjusted in conjunction with one another may be realized simply by adjustment of a positional relationship between the reflecting plate and the object. Thus, with a very simple structure, natural illumination so as to enhance the facial expression of the person who is the object without troublesome adjustment of light sources is possible.

DETAILED DESCRIPTION OF THE INVENTIONS

Herebelow, exemplary embodiments of the present invention are described in accordance with the attached drawings.

Figure 1:
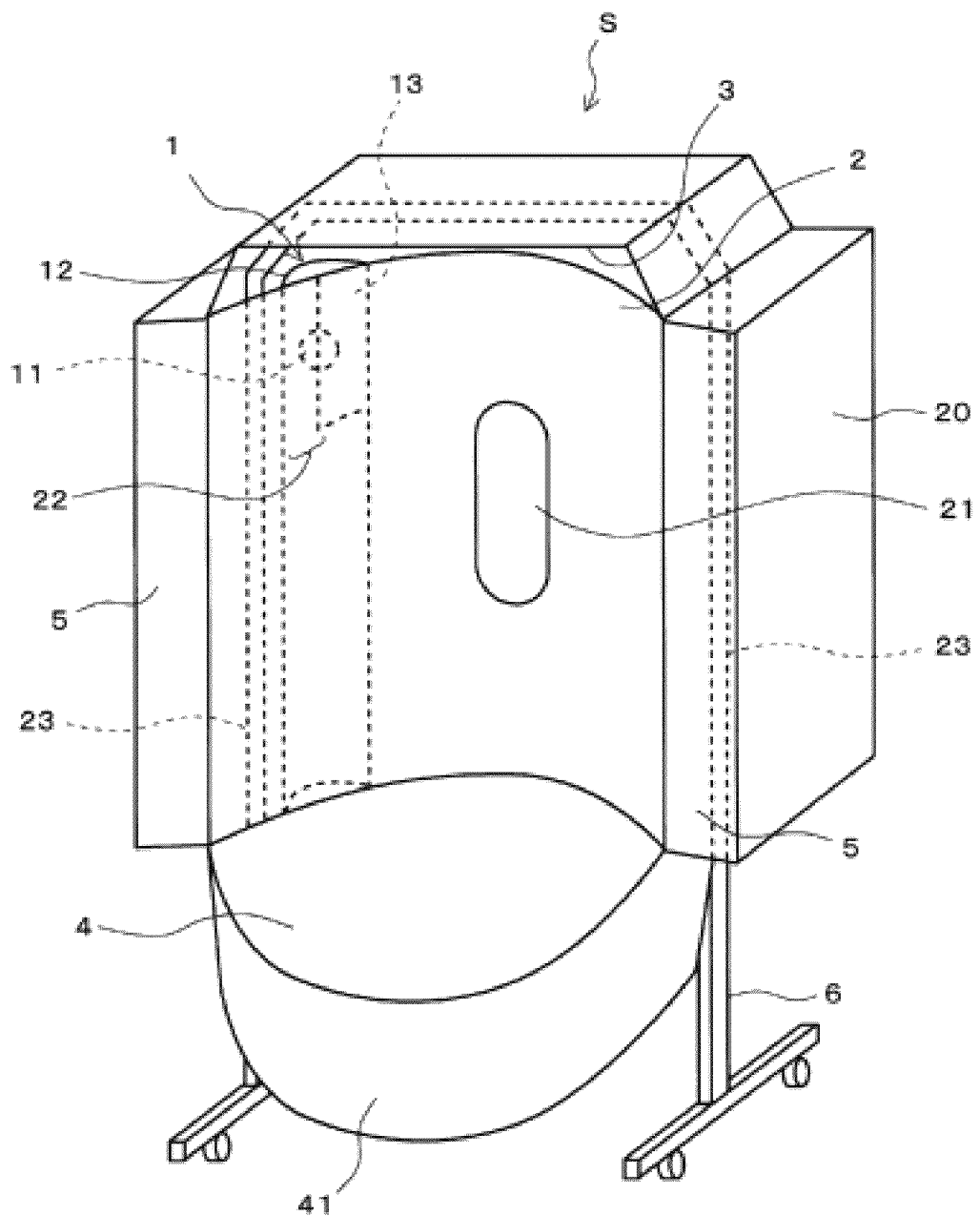
FIG. 1 is a perspective diagram illustrating general structure of a lighting device for photographing.
Figure 2:
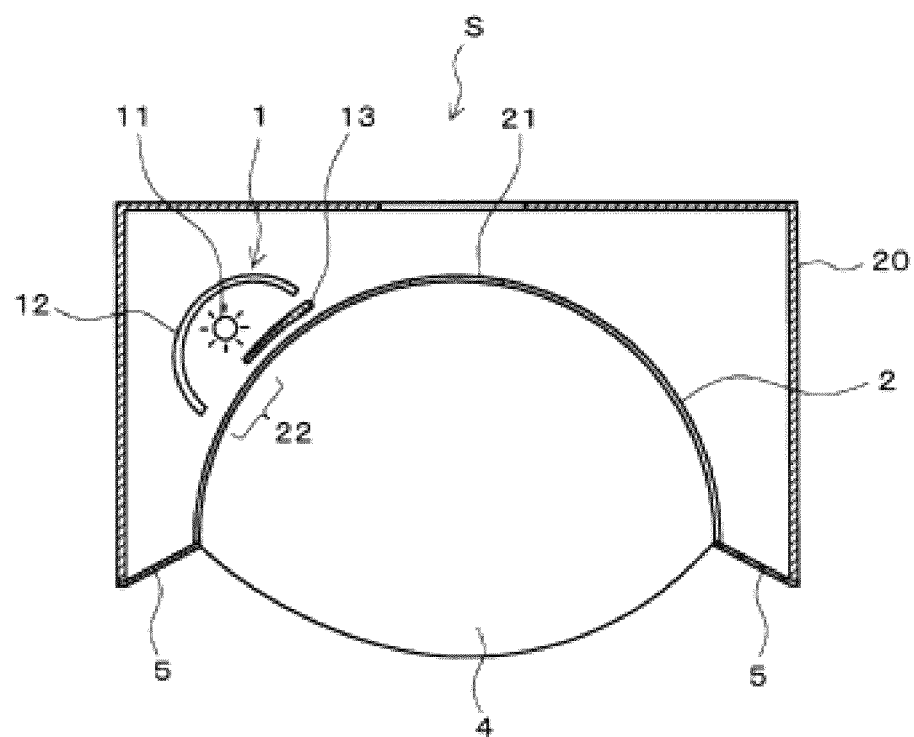
FIG. 2 is a sectional diagram of the lighting device for photographing, viewed from above.

FIG. 1 is a perspective diagram illustrating general structure of a lighting device for photographing relating to the invention. FIG. 2 is a sectional diagram of the lighting device for photographing relating to the invention, viewed from above. A lighting device for photographing S is constituted with a light emitter 1 or illumination source, a curved reflector 2, an upper reflector 3, a lower reflector 4, supplementary reflectors 5, a front cover 41 and legs 6, and is accommodated in an external cover 20. An aperture for photographing 21 is formed at a central portion of the curved reflector 2, to be at a position opposing an object to be photographed. The photography object, which is illuminated by the lighting device for photographing S and is not illustrated, is photographed through the aperture for photographing 21 by an unillustrated imaging device such as a digital still camera or the like. External dimensions of the lighting device for photographing S in the example illustrated in the present exemplary embodiment are an overall height of 200 cm, an overall width of 120 cm and a depth of 60 cm.

The light emitter 1 is provided at the convex surface side, that is, the rear face side, of the curved reflector 2, and emits light through the curved reflector 2 toward the unillustrated photography object.

Figure 3:
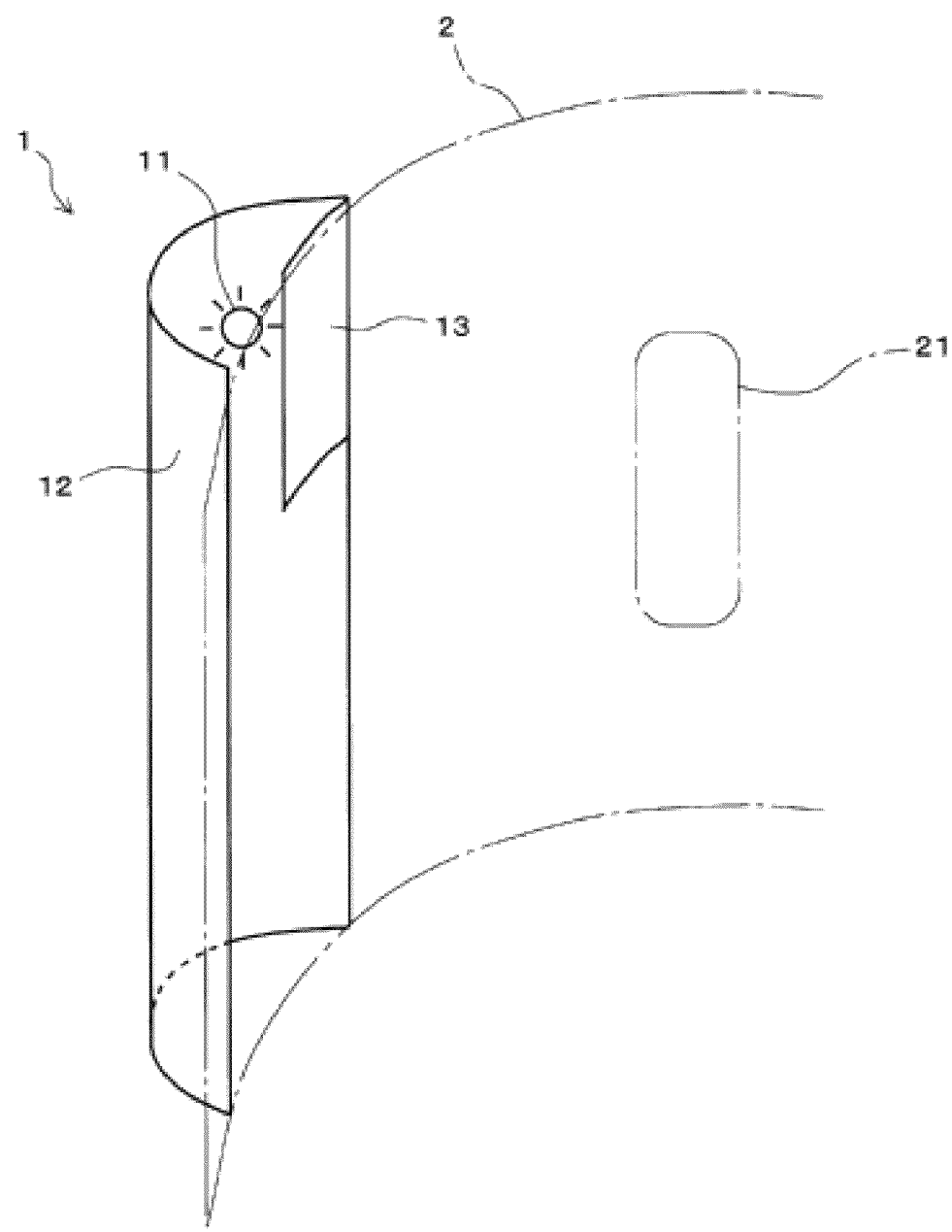
FIG. 3 is a perspective diagram illustrating general structure of a light emitter of the lighting device for photographing.

Details of the light emitter 1 will be described using FIG. 3. FIG. 3 is a perspective diagram illustrating general structure of the light emitter 1. The light emitter 1 is constituted with a light source 11, a rear reflecting plate 12 and a front reflecting plate 13.

The light source 11 is a flash lamp such as a xenon lamp, a halogen lamp or the like, of which only one is provided in the lighting device for photographing S. With electricity provided from an unillustrated electricity supply, the light source 11 emits light in synchronization with a photography operation of the unillustrated photography device. In the present exemplary embodiment, a 400 W halogen flash lamp is used. A light emission direction and light emission amount of the light source 11 may be suitably adjusted in accordance with the photographic intentions of the photographer.

The rear reflecting plate 12 is a hemi-cylindrical resin plate, of which the side that faces the light source 11 is coated silver. The rear reflecting plate 12 has a height corresponding with a height from the top end to the bottom end of the curved reflector 2, and a width (an opening width in the curved reflector 2) that is a fraction of that of the curved reflector 2, preferably not more than 50% of the total width of the reflecting surface of the curved reflector 2. The front reflecting plate 13 is a flat resin plate, of which the side that faces the light source 11 is coated silver, and has a reflectivity of 80% with respect to the light of the light source 11. The front reflecting plate 13 is adhered to the curved reflector 2 in an area 30 cm square centered on the light source 11, such that the light emitted by the light source 11 is not excessively illuminated through the curved reflector 2 onto the photography object. Upper and lower ends of the light source 11 are open, but are blocked off by the external cover 20 such that the light of the light source 11 does not leak out.

The light source 11 is disposed at a position higher than the middle of the light emitter 1. It is preferable if, when the lighting device for photographing S is set up, the light source 11 is higher than the height of the eyes of a person who is a photography object. Inside the light emitter 1, the light emitted from the light source 11 is repeatedly diffusively reflected by the rear reflecting plate 12 and the front reflecting plate 13. Thus, the spread and illumination direction of the light has low dependency on the light from the light source 11, and the light has a substantially uniform light intensity distribution. In other words, a simulation of an integrating sphere is formed by the rear reflecting plate 12 and the front reflecting plate 13. In areas from which the front reflecting plate 13 is absent, because of diffusive reflection by the rear reflecting plate 12 and the rear face of the curved reflector 2, which is described below, a space is formed in the light emitter 1 in which the uniformity is lower, though the light intensity distribution is free of strong localizations of light intensity.

The light that has been repeatedly diffused and reflected by the rear reflecting plate 12 and the front reflecting plate 13 or the rear reflecting plate 12 and the rear face of the curved reflector 2 is transmitted through a vicinity of the curved reflector 2 that faces the rear reflecting plate 12 near the light source 11, mostly through the transmission area 22 at which the front reflecting plate 13 is not provided. The transmission area 22 is preferably close to either the left or right end of the curved reflector 2. In the present exemplary embodiment, the transmission area 22 is at the left side of the curved reflector 2 as viewed from the photography object. A portion of the light diffused by the rear reflecting plate 12 and the front reflecting plate 13 is transmitted through the front reflecting plate 13, but this is very small compared to the light that is transmitted through the transmission area 22, and the light transmitted through the front reflecting plate 13 does not excessively illuminate the photography object. Although the rear reflecting plate 12 is provided in the present exemplary embodiment, a silver coating or a metallic plate may be adhered to an inner wall face of the external cover 20 to provide the function of the rear reflecting plate.

The curved reflector 2 corresponds to the first reflecting plate relating to the present invention, has a concave shaped surface that is smoothly concave in the lateral direction with respect to the unillustrated photography object, and includes the transmission area 22 that transmits the above-mentioned light. Light that is emitted from the light emitter 1 and transmitted through the transmission area 22 both illuminates the photography object and is reflected by the concave shaped surface (front surface) of the curved reflector 2 itself to illuminate the photography object.

In the example of the present exemplary embodiment, the curved reflector 2 is a translucent white polypropylene plate (with a transmissivity of 70% with respect to the light of the light source 11) with height 100 cm, width 150 cm and thickness 5 mm, which is curved into a curve with a width of 90 cm and a depth of 60 cm. Because the translucent white polypropylene plate in the present exemplary embodiment is semi-transmissive with a transmissivity of 70% of the light of the light source 11, it is not particularly necessary to employ a different material as the transmission area 22, and the polypropylene plate functions as the transmission area that transmits light in the area opposing the light emitter 1. Because a translucent white resin plate is used for the curved reflector 2, when the light emitted from the light emitter 1 is transmitted through the curved reflector 2, the light is diffused, and when light that has been transmitted through the transmission area 22 is reflected, the light is diffusively reflected. Therefore, the curved reflector 2 may prevent the occurrence of large biases in the light amount distribution. In the present exemplary embodiment, the translucent white polypropylene plate is curved into the curve with width 90 cm and depth 60 cm with a view to reducing the distance from the imaging device to the photography object to 1.2 m. However, the curve may be changed and a parabola, a hyperbolic tangent or the like may be selected, in accordance with the height of the photography object to be photographed, the separation distance between the photography object and the imaging device, the size of the curved reflector 2, a light emission amount of the light emitter 1, and the like.

The curved reflector 2 is supported by a support frame 23, made of metal piping, and the external cover 20 to form this curve. In order to retain the curve of the curved reflector 2 more securely, the polypropylene plate may be plastically deformed by a heat treatment and, because a thin resin plate is employed, the lighting device for photographing S may have lower weight.

The aperture for photographing 21, with an elongated circle shape with a height of 30 cm and a width of 18 cm, is provided penetrating through the external cover 20 and the curved reflector 2 of the lighting device for photographing S at a position at the middle of the curved reflector 2 that opposes the photography object. The aperture for photographing 21 is an opening that is vertically long in order that the photographer may move the imaging device within a range of the aperture for photographing 21. Because of this, the imaging device may be disposed directly opposite the photography object (for example, the face of the photography object) regardless of the height of the photography object. The imaging device for photographing the photography object illuminated by the lighting device for photographing S is disposed at the rear face side of the lighting device for photographing S, at the aperture for photographing 21. The imaging device records optical information of the illuminated photography object chemically, physically or electronically.

For example, a still camera, a video camera, a silver halide film camera or the like is used. In the present exemplary embodiment, a digital still camera is used.

The upper reflector 3 is provided above the curved reflector 2 and functions as a second reflecting plate that reflects light that has been transmitted through the transmission area 22 toward the photography object. The upper reflector 3 is a reflective plate for which a polycarbonate board with depth 50 cm and width 100 cm, to which an aluminium plate is adhered, is made flat and is disposed to be level and protrude 20 cm beyond the frontmost portions of the curved reflector 2. The upper reflector 3 totally reflects or diffusively reflects transmitted light from the transmission area 22. The polycarbonate board to which the aluminium plate is adhered that constitutes the upper reflector 3 is also used as an inner wall face of the external cover 20. The upper reflector 3 may be constituted by a mirror, a white plate, or a board of resin, metal or the like that has been subjected to surface processing such as coating, grinding or the like so as to reflect light. Because of the upper reflector 3, light corresponding to a top light may be illuminated at the photography object without an additional light source being used.

The lower reflector 4 is provided below the curved reflector 2, and functions as a third reflecting plate that reflects light that has been transmitted through the transmission area 22 toward the photography object. The lower reflector 4 is a transparent polycarbonate board with depth 80 cm and width 80 cm. The front face of the transparent polycarbonate board is smooth and the rear face is embossed. The front face is the upper face and is angled 20 degrees from the horizontal toward the photography object. This reflecting plate is disposed to protrude 20 cm beyond the frontmost portions of the curved reflector 2, and totally reflects or diffusively reflects light transmitted from the transmission area 22. Because of the lower reflector 4, the photography object may be illuminated with light corresponding to a supplementary light from below without an additional light source being used, and shadows that occur below the nose, jaw and the like of the person who is the photography object may be moderated.

In the present exemplary embodiment, the lower reflector 4 is formed of the transparent polycarbonate board with the smooth front face in order to suppress occurrences of unnatural shadows by suppressing light amounts with which the lower reflector 4 illuminates the photography object, in comparison with the curved reflector 2 and the upper reflector 3. However, this does not mean that using a translucent white polypropylene plate similar to the curved reflector 2 is precluded.

The supplementary reflectors 5 are provided at the ends of the curved reflector 2 at both sides thereof, and reflect light that has been reflected by the curved reflector 2 toward the photography object. Each of the left and right supplementary reflectors 5 is a reflecting plate similar to the upper reflector 3, being a polycarbonate board with height 100 cm and width 10 cm to which an aluminium plate is adhered. These reflecting plates are made to oppose the photography object. The supplementary reflectors 5 are also used as the external cover 20, and totally reflect or diffusively reflect light that has been reflected by the curved reflector 2.

The front cover 41 is constituted by a transparent polycarbonate plate that is curved so as to protrude by a maximum of 20 cm beyond the frontmost portions of the curved reflector 2, so as to cover the legs 6. Because the front cover 41 and the lower reflector 4 are embossed transparent polycarbonate plates, a supplementary light source may be provided if required and illuminate supplementary light that is diffused by the front cover 41 and the lower reflector 4 at the photography object.

The legs 6 are constituted of pipes made of metal, and retain the light emitter 1, the curved reflector 2, the upper reflector 3, the lower reflector 4, the supplementary reflectors 5, the front cover 41 and the external cover 20 at a predetermined height. In the present exemplary embodiment, because the aperture for photographing 21 has a vertically long shape, there is no need for a function of height adjustment by the legs 6. However, if the height of the imaging device cannot be adjusted in the range of the aperture for photographing 21, a height adjustment function may be provided and height adjustment by the legs 6 enabled. Instead of the legs 6, the light emitter 1, the curved reflector 2, the upper reflector 3, the lower reflector 4 and the supplementary reflectors 5 may be retained at a predetermined height on a wall face by a retaining fixture.

Figure 4:
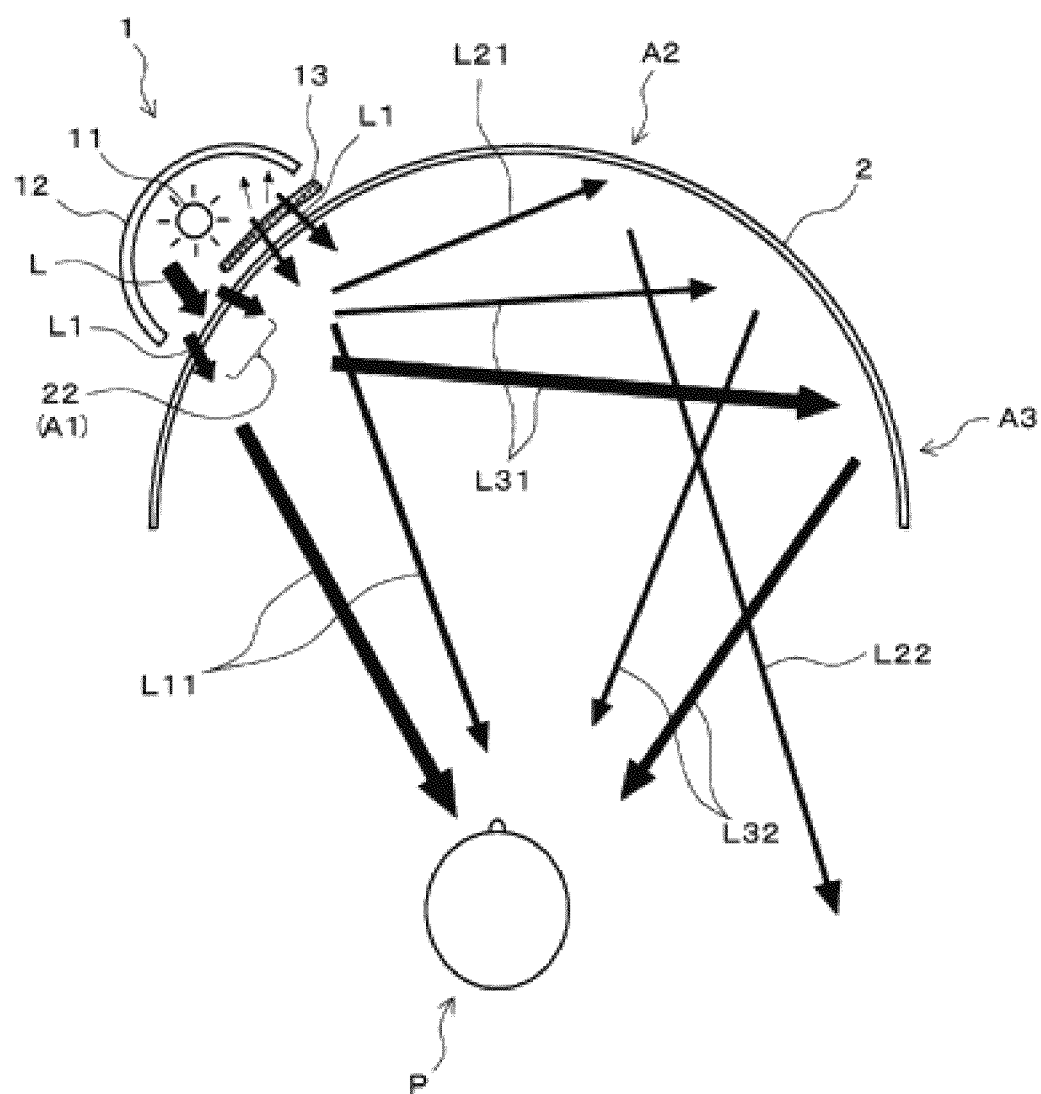
FIG. 4 is a sectional diagram, viewed from above, schematically illustrating operation of the lighting device for photographing.

Operation of the lighting device for photographing S will be described using FIG. 4. FIG. 4 is a sectional diagram, viewed from above, schematically illustrating operation of the lighting device for photographing S. The light emitted from the light emitter 1 is represented by arrows.

The light L that is radiated from the light source 11 is repeatedly diffusively reflected by the rear reflecting plate 12 and the front reflecting plate 13 and then emitted from the light emitter 1. The light L1 that is emitted from the light emitter 1 is transmitted through the transmission area 22 of the curved reflector 2, and a portion thereof goes directly to the photography object P as light L11.

Because the light emitted from the light emitter 1 and transmitted through the transmission area 22 has been repeatedly diffusively reflected by the rear reflecting plate 12 and the front reflecting plate 13, the light has a relatively uniform light intensity distribution. Therefore, apart from the light L11 that directly illuminates the photography object P, the light is diffused with a substantially uniform distribution. Because of the curve of the curved reflector 2, of the light that is transmitted through the transmission area 22, light L21 toward a central vicinity of the curved reflector 2 is reflected to locations that are distant from the photography object P and becomes reflected light L22, and light L31 toward an area of the curved reflector 2 that is distant from the transmission area 22 is totally reflected or diffusively reflected by the curved reflector 2 and converges toward the photography object P as reflected light L32.

Figure 5:
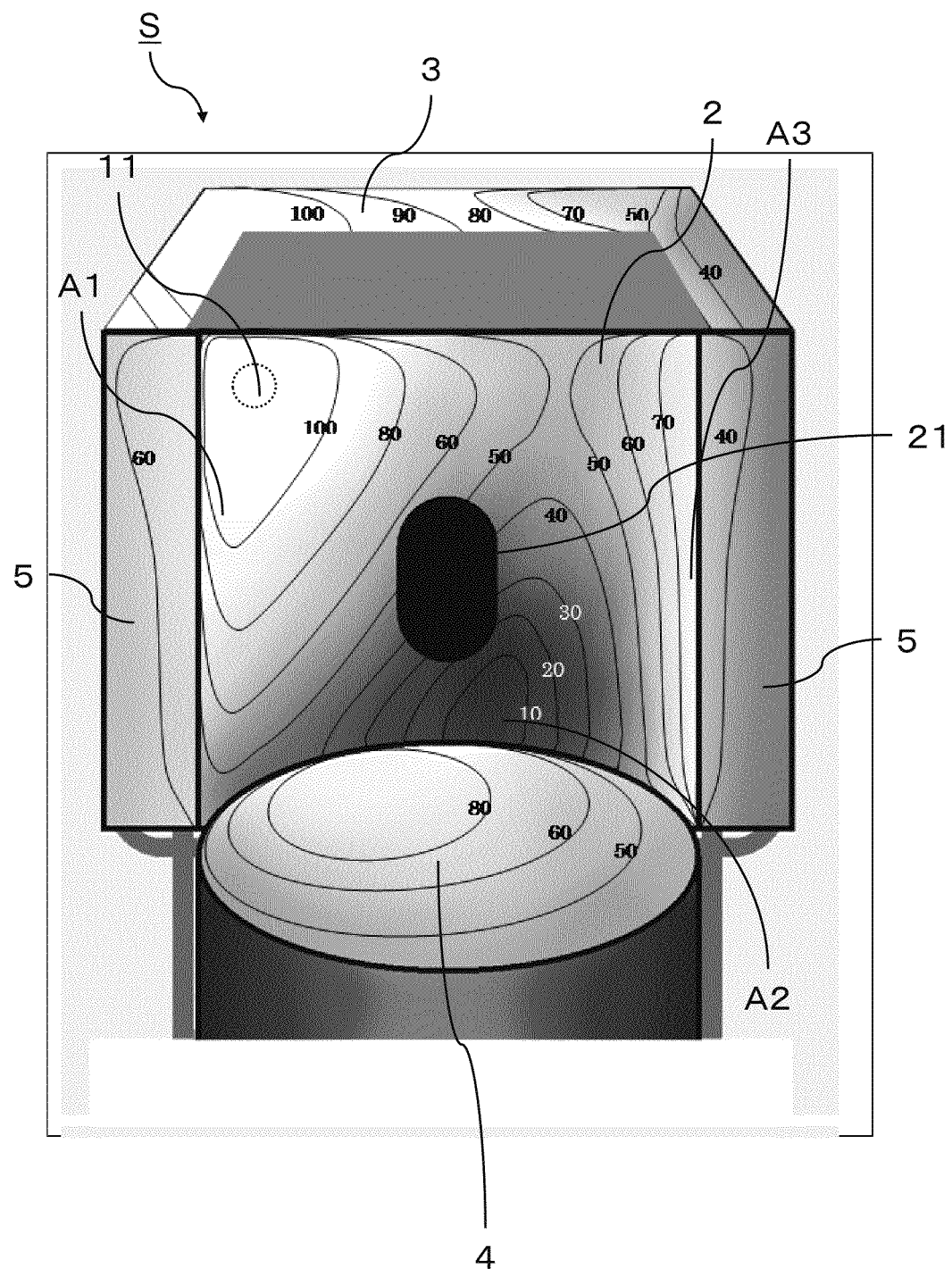
FIG. 5 is a diagram illustrating relative strengths of illumination light of the lighting device for photographing observed from an object to be photographed.

FIG. 5 is a diagram illustrating relative strengths of illumination light of the lighting device for photographing S observed from the photography object P of FIG. 4. Relative strengths of the illumination light are represented by contours, with the strength of illumination light in the area with the strongest light, that is, the vicinity of the light source 11, having a value of 100.

The illumination light, which is most intense in an area (a highest light amount area) A1 of the transmission area 22 that is close to the light source 11, decreases continuously along the curved reflector 2 and is weakest in an area (a lowest light amount area) A2 that is close to a central vicinity at the lower side of the aperture for photographing 21, with a light intensity around 1/10 that of the area A1 close to the light source 11. The convergence of the reflected light L31 is stronger toward another end area (a second high light amount area) A3 that is furthest from the light source 11, and the illumination light strengthens continuously. On the upper reflector 3 and the lower reflector 4, the illumination light decreases with distance from the light source 11.

That is, the illumination light amounts as observed from the photography object continuously decrease in the horizontal direction from the highest light amount area A1 (the transmission area 22) to the lowest light amount area A2 and, at the opposite side of the lowest light amount area A2 from the highest light amount area A1, continuously increase to the second high light amount area A3. The second high light amount area A3 has lower illumination light amounts than the illumination light amounts of the highest light amount area A1. Due to this configuration, with just the one light source 11 being provided, a state of illumination as if the photography object were being illuminated by plural light sources with respective light amounts adjusted in conjunction with one another may be realized just by adjustment of a positional relationship between the reflecting plates and the photography object. Thus, with a very simple structure, natural illumination so as to enhance the facial expression of the person who is the photography object without troublesome adjustment of light sources and without unnatural shadows being produced on the photography object is possible.

Differences in illumination light amounts between the highest light amount area A1 and the lowest light amount area A2 when observed from the photography object are kept within a range of at least 10 times and at most 20 times. Therefore, a case of very strong light reaching the photography object, being totally reflected by, for example, spectacles that the photography object is wearing or skin oil or the like, and shining into the imaging device does not occur, and natural illumination so as to enhance the facial expression of the person who is the photography object is possible.

In the present exemplary embodiment, the illumination light amount distribution illustrated in FIG. 5 is implemented by the light emitter 1 and the curved reflector 2 as a planer illumination relating to the present invention. However, an illumination light amount distribution like that illustrated in FIG. 5 may be implemented by providing plural light sources such as light emitting diodes or the like as the planer illumination.

Figure 6:
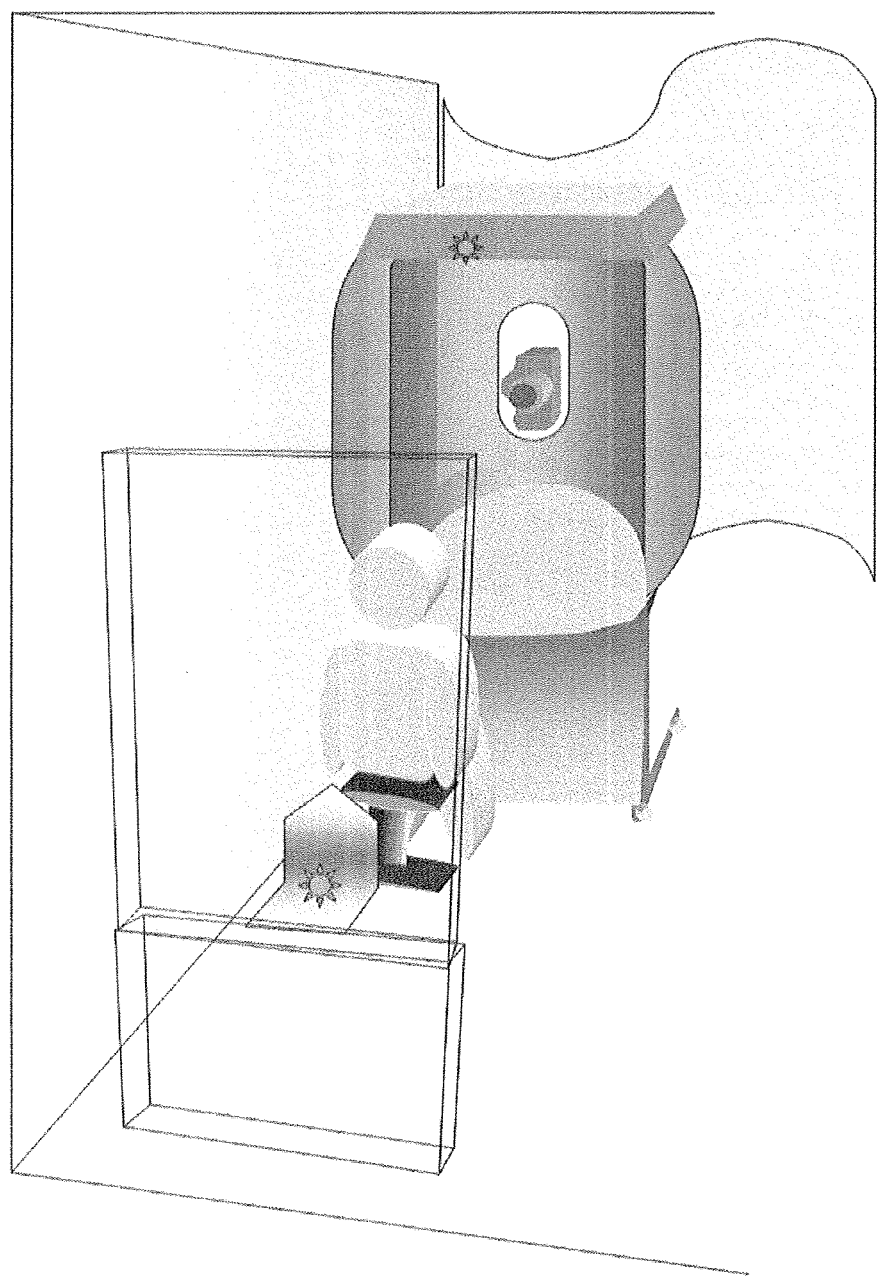
FIG. 6 is a schematic perspective diagram of a photographic studio in which the lighting device for photographing is employed.

A photographic studio in which the lighting device for photographing S relating to the present invention is employed will be described using FIG. 6. FIG. 6 is a schematic perspective diagram of the photographic studio in which the lighting device for photographing S is employed. The lighting device for photographing S is disposed directly in front of the person P who is the object to be photographed, and the height is adjusted such that an imaging device 72 may be disposed pointing through the aperture for photographing 21 at a position that is at the height of the face when the person P is sitting on a chair 71. A separation distance between the imaging device 72 and the person P is 1.2 m.

A screen 73 is disposed at the back of the person P. The separation distance between the imaging device 72 and the screen 73 is 2 m. The separation between the person P and the screen 73 is around 50 cm. With this separation distance, illumination light from the lighting device for photographing S passes round to the back of the person P and uniformly illuminates the screen 73. Thus, a photograph in which the person P is sharply defined is possible. If required, supplementary lamps may be provided that emit light in synchronization with the light source 11 of the lighting device for photographing S and imaging operations of the imaging device 72.

As described above, according to the present exemplary embodiment, light is emitted from the light emitter 1, and the light transmitted through the transmission area 22 of the curved reflector 2 both illuminates the photography object P and is reflected at reflecting areas of the curved reflector 2 to illuminate the photography object P. Thus, the transmitted light and reflected light may illuminate the photography object P continuously without border lines in the illumination light amounts.

Because the curved reflector 2 includes the aperture for photographing 21 at the location facing the photography object and pictures are taken through the aperture for photographing 21, the photography object may be photographed from directly in front with ideal illumination light being illuminated thereon.

Because the upper reflector 3 that reflects light transmitted through the transmission area 22 toward the photography object is included above the curved reflector 2, light corresponding to a top light may be illuminated at the photography object without an additional light source being used, and the facial expression of the person who is the photography object may be enhanced.

Because the lower reflector 4 that reflects light transmitted through the transmission area 22 toward the photography object is included below the curved reflector 2, light corresponding to a supplementary light may be illuminated from below the photography object without an additional light source being used, and shadows that occur under the nose, jaw and the like of the photography object may be moderated.

The exemplary embodiment of the lighting device for photographing S described above is constituted with the front face of the lower reflector 4 that is the third reflecting plate being a level flat board. However, the front face of this lower reflector 4 may be configured to include a concave shaped surface that is smoothly concave with respect to the photography object P, with other structures being the same as in the lighting device for photographing S.

Figure 7A:
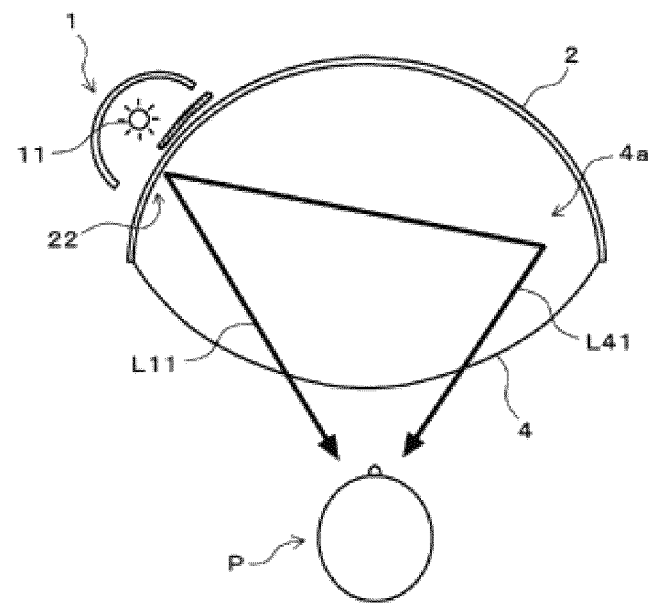
FIG. 7(a) is a sectional diagram, viewed from above, schematically illustrating operation of a lower reflector relating to another exemplary embodiment.
Figure 7B:
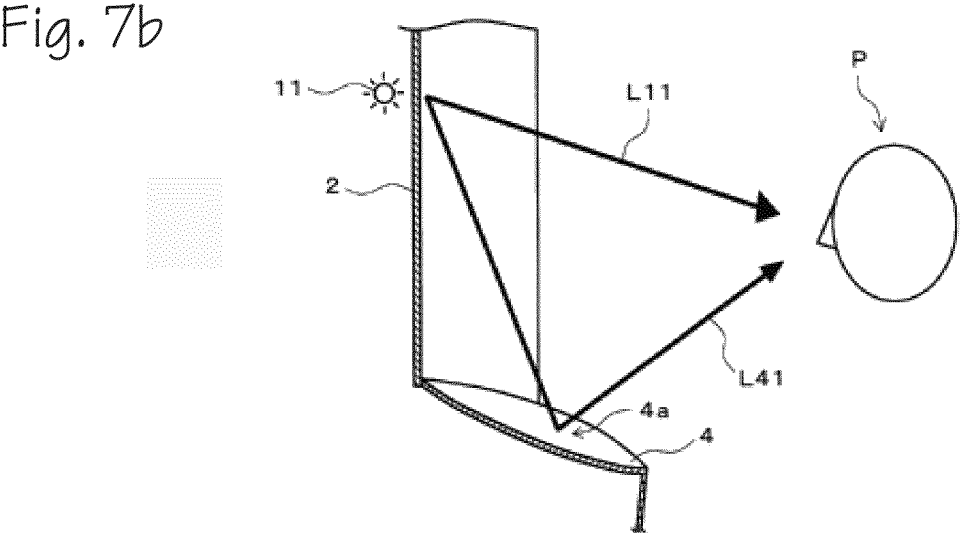
FIG. 7 (b) is a sectional diagram, viewed from sideward, schematically illustrating operation of the lower reflector relating to the other exemplary embodiment.

When the front face of the lower reflector 4 is formed as a concave shaped surface with respect to the photography object P, as illustrated in FIG. 7, a portion of the light from the light source 11 that is transmitted through the transmission area 22 of the curved reflector 2 is reflected toward the photography object P from an area 4a at the side of the front face of the lower reflector 4 that is further from the position at which the light source 11 is disposed, and may illuminate the photography object P with reflected light L41. This reflected light L41 is light that illuminates the photography object P from a diagonal direction relative to the light L11 that is transmitted through the transmission area 22 and directly illuminates the photography object P. Further, because the reflected light L41 is light that is reflected by the lower reflector 4, light amounts thereof are somewhat lower than the light L11 that directly illuminates the photography object P from the transmission area 22.

Therefore, the lower reflector 4 with the concave shaped surface may illuminate the reflected light L41, with somewhat lower light amounts than the light L11, at shadows that are formed by the light L11 being illuminated at protruding portions on the surface of the face of the photography object P, for example, the nose, the jaw and the like, from a direction that eliminates the shadows. Thus, because natural shadows are formed rather than deep shadows possibly remaining in the facial expression of the photography object P, the facial expression of the photography object P may be further enhanced.

Moreover, the lower reflector 4 with this concave shaped surface may illuminate light from a direction substantially at a right angle to the surface of the (face of the) photography object P, which overall is a convex surface, and the formation of unnatural shadows is eliminated.

Figure 8:
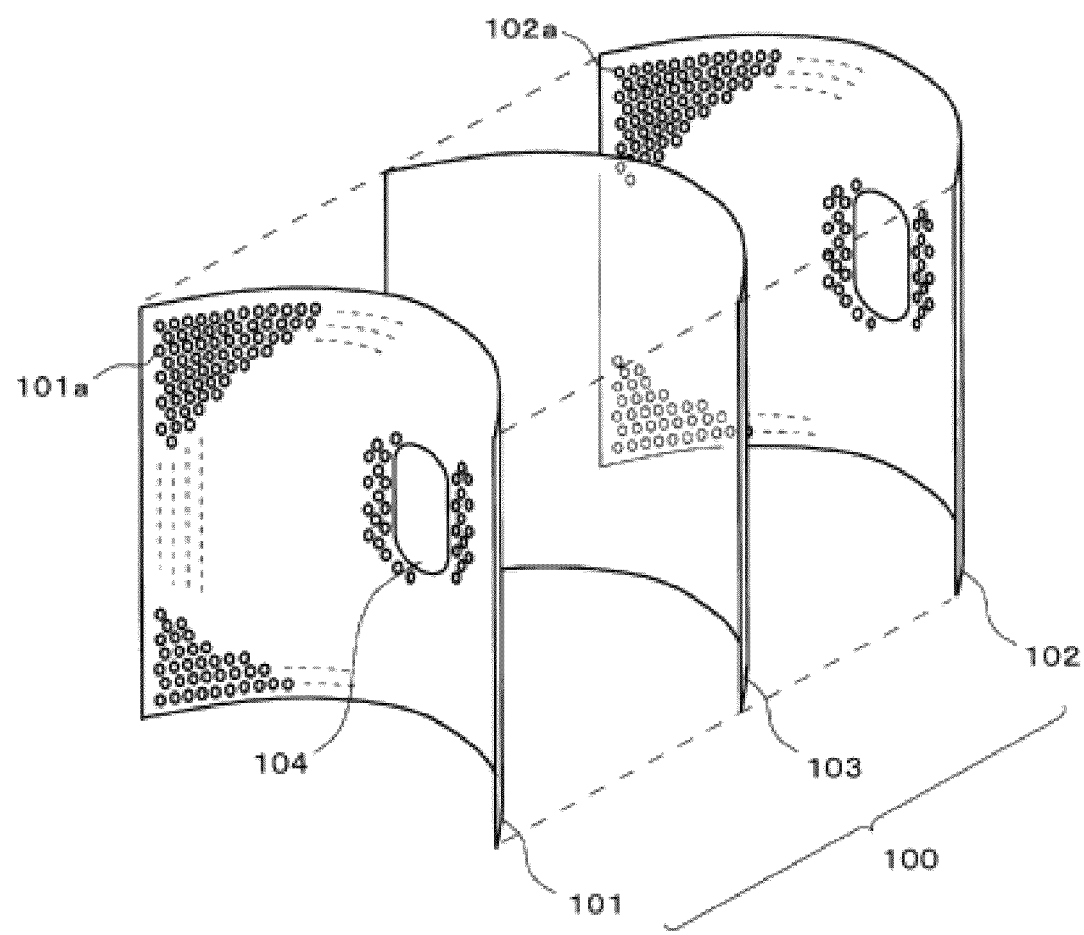
FIG. 8 is an exploded perspective diagram of a curved reflector relating to a further exemplary embodiment.

FIG. 8 is an exploded perspective diagram illustrating another exemplary embodiment of the curved surface that is the first reflecting plate. This curved reflector 100 is constituted by two metal plates 101 and 102 being superposed with a semi-transparent resin plate 103 that is sandwiched between the metal plates 101 and 102. Similarly to the curved reflector 2 described above, the curved reflector 100 has a concave shaped surface that is concavely curved in the lateral direction with respect to an unillustrated object to be photographed. A central portion of the curved reflector 100 includes an aperture for photographing 104 that penetrates through the metal plates 101 and 102 and the resin plate 103.

The metal plates 101 and 102 include numerous small holes 101a and 102a that are arranged with regularity over the whole areas of the metal plates 101 and 102, in order to transmit the light from the light emitter 1, which is disposed at the rear face side of the curved reflector 100 (see FIG. 1 and FIG. 2), and enable illumination toward the photography object.

Figure 9:
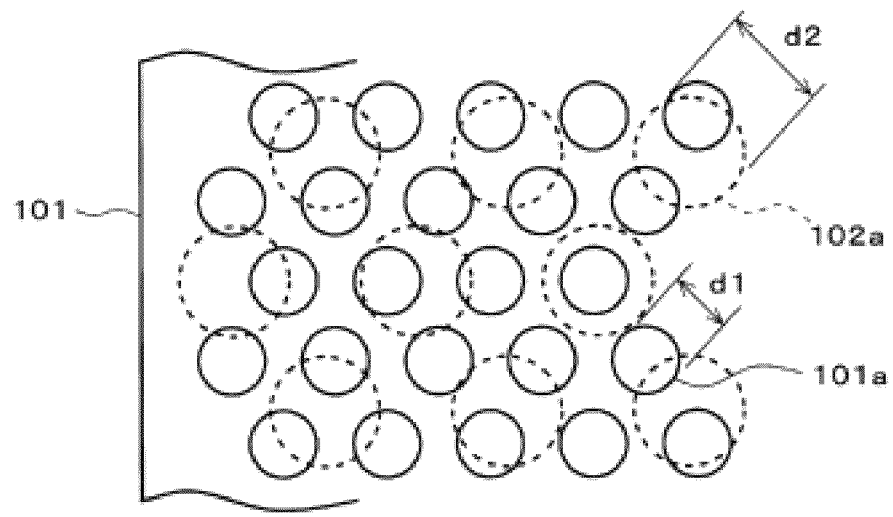
FIG. 9 is a partial enlarged diagram of the curved reflector illustrated in FIG. 8.

FIG. 9 is a partial enlarged diagram of the curved reflector 100. As illustrated in FIG. 9, the small holes 101a of the metal plate 101 and the small holes 102a of the metal plate 102 have different hole diameters and pitches. That is, a hole diameter d2 of the small holes 102a of the metal plate 102 disposed at the rear face side is larger than a hole diameter d1 of the small holes 101a of the metal plate 101 disposed at the side facing the photography object, and the pitches of the small holes 101a and 102a are not equal. In the present exemplary embodiment, the small holes 101a of the metal plate 101 at the front face side have a diameter of 3 mm and are arranged with a pitch of 5 mm, and the small holes 102a of the metal plate 102 at the rear face side have a diameter of 5 mm and are arranged with a pitch of 8 mm. Of the metal plates 101 and 102, at least the front face of the metal plate 101 at the side facing the photography object is coated white. Thus, the front face of the metal plate 101 functions as a reflecting surface that reflects light toward the photography object.

There is a gap of 0.5 to 1.2 mm between the two metal plates 101 and 102. This gap is defined by the thickness of the resin plate 103. The resin plate 103 may be formed of, for example, an acrylic plate. The resin plate 103 is colorless but is semi-transparent due to a satin finish being formed on at least one face. Accordingly, the resin plate 103 has the function of diffusing transmitted light.

The curved reflector 100 that is structured thus permits light emitted from the light source 11 of the light emitter 1 (see FIG. 1 and FIG. 2) to pass through the small holes 102a of the metal plate 102, the resin plate 103, and the small holes 101a of the metal plate 101. The curved reflector 100 both directly illuminates light toward the photography object and reflects a portion of the light that has passed through the small holes 101a of the metal plate 101 from the front face of the metal plate 101 to illuminate the reflected light toward the photography object. Because the small holes 102a of the metal plate 102 at the rear face side have the larger hole diameter, and the small holes 101a of the metal plate 101 and the small holes 102a of the metal plate 102 are arrayed with different pitches, the curved reflector 100 includes holes that may transmit light with a uniformly dispersed arrangement overall. Therefore, light with an intensity distribution similar to that when the curved reflector 2 is used may be illuminated toward the photography object.

Because the semi-transparent resin plate 103 is sandwiched between the two metal plates 101 and 102, light that passes through the small holes 102a of the metal plate 102 is internally dispersed by the resin plate 103, and passes through the small holes 101a of the metal plate 101. Therefore, the resin plate 103, in combination with the structure of the small holes 101a and 102a with different hole diameters and pitches, operates to disrupt regularity of the transmitted light, and prevents moiré occurring in a photographed image.

Because this curved reflector 100 uses the metal plates 101 and 102, the curved reflector 100 is more robust than the curved reflector 2 made of resin, and has high endurance even to the permeation of water. Therefore, a lighting device for photography that employs this curved reflector 100 may be installed outdoors.

Figure 10:
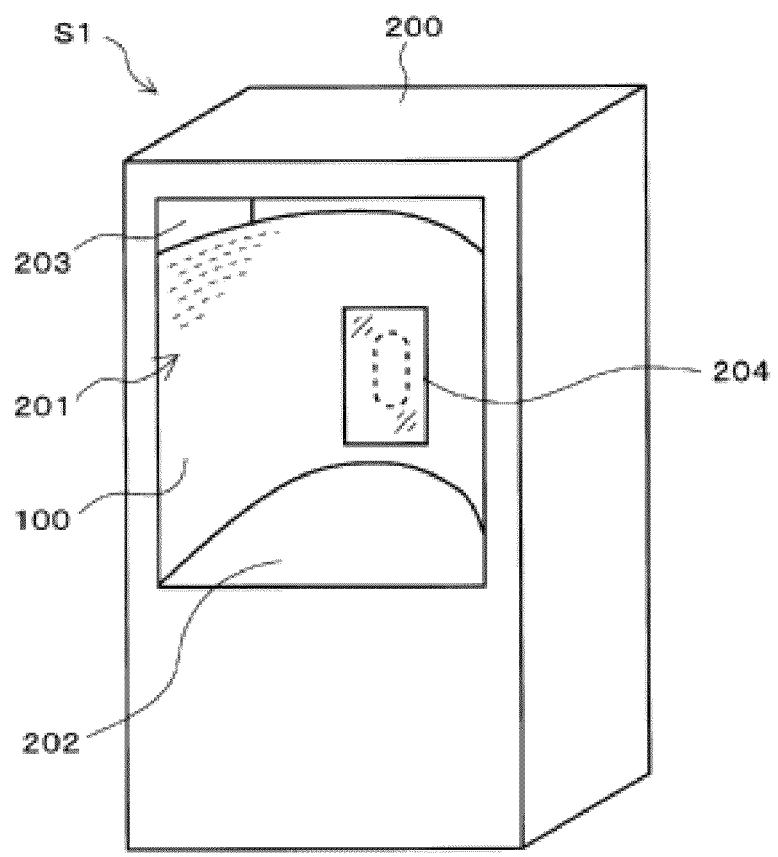
FIG. 10 is a perspective diagram of the lighting device for photographing relating to the further exemplary embodiment.

FIG. 10 is a perspective diagram illustrating a structural example of a lighting device for photographing S1 that is deployed at an outdoor installation, using the curved reflector 100. The lighting device for photographing S1 is formed with a casing 200 made of a metal such as steel or the like. A front face of the casing 200 includes a rectangular aperture 201. The curved reflector 100 is disposed inside the aperture 201. In the lighting device for photographing S1, similarly to the lighting device for photographing S, a light emitter and an imaging device (neither of which is illustrated) and the like are disposed in the casing 200 at the rear face side of the curved reflector 100.

A lower reflector 202 that is angled downward toward the photography object is provided at the front face side below the curved reflector 100. Similarly to the lower reflector 4 illustrated in FIG. 7, this lower reflector 202 may include a concave shaped surface that is concave with respect to the photography object.

Inside the aperture 201, a gap 203 is formed between the top of the curved reflector 100 and the casing 200. Light from the light emitter may be illuminated from the rear face side of the curved reflector 100 through this gap 203 to the photography object. The inner side of the casing 200 at the aperture 201 is a reflective surface coated silver and features the function of illuminating light corresponding to a top light at the photography object, similarly to the upper reflector 3 of the lighting device for photographing S.

A mirror 204 may be provided at the middle of the curved reflector 100 so as to cover the front face of the aperture for photographing 104. This mirror 204 is constituted by a half-mirror that reflects light from the photography object side thereof and transmits light from the imaging device side thereof. In addition to a function of protecting the imaging device disposed at the aperture for photographing 104, the mirror 204 has the function, by showing the posture (and face) of a photography object, of allowing the photography object to check his or her posture (and face) at the time of photography. Thus, the lighting device for photographing S1 enables photography operations by photography objects themselves, without the need for a specialist photographer.

In further embodiments, any or all of the curved reflector 2 that is the first reflecting plate, the upper reflector 3 that is the second reflecting plate, the lower reflector 4 that is the third reflecting plate, and the supplementary reflector 5 may be constituted using a fabric.

As this fabric, it is preferable to use a fabric with light transmissivity and light reflectivity equivalent to the translucent white polypropylene plate. For example, fabrics that are woven or knitted using glass fibers, synthetic fibers, cotton, silk or the like may be excellently employed. Weaving methods, knitting methods and the like are not particularly limited. Nonwoven fabrics may also be used.

As necessary, the front face or rear face of the fabric may be coated white, translucent white, silver or the like.

A fabric may not retain a shape by itself. Therefore, it is preferable to form a predetermined curved surface using frame members with thicknesses such that transmission and reflection of the light will not be impeded. Linear members or rods made of metal, resin or wood (including bamboo) may be used as frame members. A framework combining plural frame members machined to predetermined curved shapes and the like may be formed, and the lighting device for photographing may be simply structured by stretching the fabric over this framework.

When the lighting device for photographing is constituted with this fabric, the device may be made lighter and more compact. Therefore, the lighting device for photographing is not limited to types that are installed in studios, and the lighting device for photographing may be held by hand by the photographer themself. Therefore, there is an advantage in that photographs may easily be taken in arbitrary photography locations in the outdoors and the like.

A preferable method of retaining the shape of a fabric is to form a bag using a fabric as described above and structure any or all of the curved reflector 2, the upper reflector 3, the lower reflector 4 and the supplementary reflector 5 by forming a gas bag inside which air or another gas is sealed. When the shape is retained by sealing air or another gas in a gas bag, frame members are unnecessary or may be kept to the minimum necessary, and the structure may be made simpler and lighter.

When the lighting device for photographing is not in use, the air may be let out and the gas bag compactly folded. Therefore, storage and carrying characteristics may be improved.

By using a gas lighter than air such as helium or the like as the gas, the lighting device for photographing may be made lighter, and it may be made even easier for the photographer to hold the device by hand and take pictures.

If the curved reflector 2 is constituted by a gas bag in this manner, the light source 11 may be disposed inside the gas bag, a surface of the gas bag at the photography object P side thereof may serve as a reflective surface of the curved reflector 2, and light may be illuminated toward the photography object P in the same manner as in the first exemplary embodiment.

Figure 11:
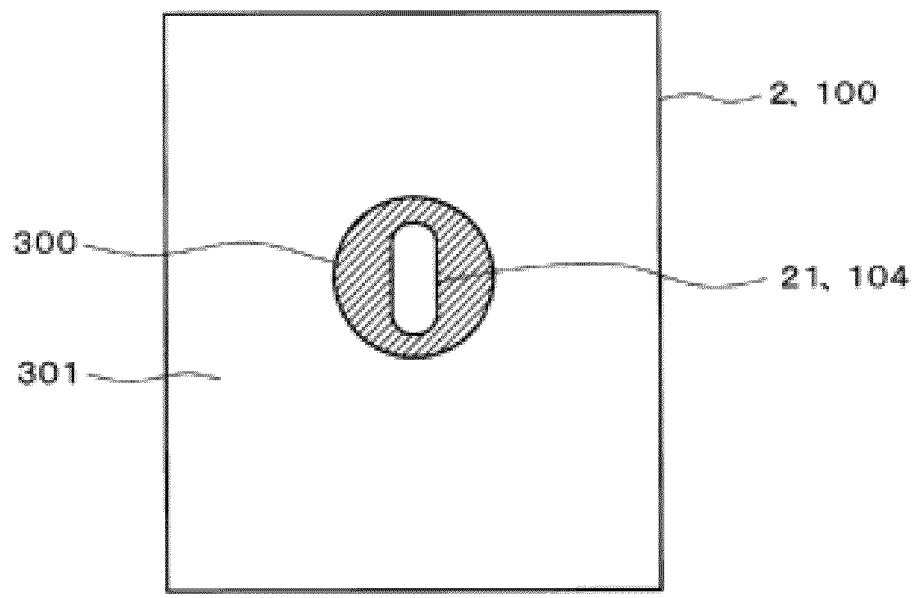
FIG. 11 is a front view of a curved reflector relating to yet another exemplary embodiment.

In yet another exemplary embodiment of the curved reflector 2 or 100 that is the first reflecting plate described above, as illustrated in FIG. 11, a central area of the front face side thereof includes a low reflection area 300 in which the reflectivity of the light is lower than in an other area 301. This low reflection area 300 is an area that is formed in a circular shape surrounding and containing the aperture for photographing 21 or 104, and may be formed by the front face being colored gray or the like such that the light reflectivity is lower than the light reflectivity of the other area 301 of the curved reflector 2 or 100.

The curved reflector 2 or 100 that includes the low reflection area 300 at the central area thereof prevents strong reflected light being illuminated at the pupils of the person who is the photography object, and a picture of the photography object in which the pupils are black and have clear outlines may be taken.

The low reflection area 300 may be formed by a separate resin plate from the curved reflector 2 or 100 and be constituted to be attachable and detachable at the front face of the curved reflector 2 or 100. A low reflection area 300 of this type may be attached to the central area of the curved reflector 2 or 100 and used as required.

I claim:
1. A lighting device for photographing objects comprising:
a light emitter; and
a first reflecting plate having a concave shaped surface with respect to an object to be photographed, including a transmission area that transmits light emitted from the light emitter, reflecting at least a part of light transmitted through the transmission area and illuminating object to be photographed, wherein illumination light amounts as observed from the object to be photographed in a horizontal direction continuously decrease along the concave shaped surface of the first reflecting plate from the transmission area to a lowest light amount area, and continuously increase along the concave shaped surface of the first reflecting plate from the lowest light amount area to a second high light amount area, which is at the opposite side of the lowest light amount area from the side at which the transmission area is disposed, and wherein the illumination light amount at the second high light amount area is smaller than the illumination light amount at the transmission area.

2. The lighting device for photographing objects according to claim 1, wherein the first reflecting plate includes an aperture for photographing at a central portion that opposes the object to be photographed.

3. The lighting device for photographing an object according to claim 1, wherein illumination light amounts as observed from the object to be photographed continuously decrease along the concave shaped surface of the first reflecting plate from the transmission area to a lowest light amount area, and continuously increase along the concave shaped surface of the first reflecting plate from the lowest light amount area to a second high light amount area, which is at the opposite side of the lowest light amount area from the side at which the transmission area is disposed, and wherein the illumination light amount at the second high light amount area is smaller than the illumination light amount at the transmission area.

4. The lighting device for photographing objects according to claim 1, wherein the illumination light amount at the transmission area is at least 10 times and at most 20 times the illumination light amount at the lowest light amount area.

5. The lighting device for photographing objects according to claim 1, further comprising, above the first reflecting plate, a second reflecting plate that reflects light transmitted through the transmission area toward the object to be photographed.

6. The lighting device for photographing objects according to claim 1, further comprising, below the first reflecting plate, a third reflecting plate that reflects light transmitted through the transmission area toward the object to be photographed.

7. A lighting device for photographing objects comprising:

an illumination source having a surface with respect to an object to be photographed, wherein illumination light amounts as observed from the object to be photographed in a horizontal direction continuously decrease along the surface of the surface from a highest light amount area to a lowest light amount area, and continuously increase along the surface of the planer illumination from the lowest light amount area to a second high light amount area, which is at the opposite side of the lowest light amount area from the side at which the highest light amount area is disposed, and wherein the illumination light amount at the second high light amount area is smaller than the illumination light amount at the transmission area.

8. The lighting device for photographing an object according to claim 7, wherein the illumination light amount at the highest light amount area is at least 10 times and at most 20 times the illumination light amount at the lowest light amount area.

9. The lighting device for photographing an object according to claim 7, further comprising, above the planer illumination, a second reflecting plate that reflects light illuminated by the planer illumination toward the object to be photographed.

10. The lighting device for photographing an object according to claim 7, further comprising, below the planer illumination, a third reflecting plate that reflects light illuminated by the planer illumination toward the object to be photographed.

* * * * *